Feb. 14, 1967 W. DAWSON ET AL 3,303,620
JOINING SHEET MATERIALS
Filed Dec. 9, 1963 6 Sheets-Sheet 1

INVENTORS
WILLIAM DAWSON
DAVID CHARLES KIRBY
By Cushman, Darby & Cushman
ATTORNEYS

INVENTORS
WILLIAM DAWSON
DAVID CHARLES KIRBY

Feb. 14, 1967   W. DAWSON ET AL   3,303,620
JOINING SHEET MATERIALS

Filed Dec. 9, 1963   6 Sheets-Sheet 6

INVENTORS
WILLIAM DAWSON
DAVID CHARLES KIRBY
By
Cushman, Darby & Cushman
ATTORNEYS

United States Patent Office 3,303,620
Patented Feb. 14, 1967

3,303,620
JOINING SHEET MATERIALS
William Dawson, Welwyn Garden City, and David Charles Kirby, Welwyn, England, assignors to Imperial Chemical Industries Limited, London, England, a corporation of Great Britain
Filed Dec. 9, 1963, Ser. No. 328,922
Claims priority, application Great Britain, Dec. 18, 1962, 47,750/62
6 Claims. (Cl. 52—309)

The present invention relates to improvements in or relating to joining sheet materials and in particular to joining thermoplastic sheet materials.

It is often desired to construct structures in which rigid panels of thermoplastic sheet materials are joined together and are fastened to a backing structure such as a solid wall. This is particularly desirable when using such panels as weather boarding or as interior structural members in buildings, so that an air space may be obtained between the backing structure and the rigid panel of thermoplastic material, for example, in order to improve the thermal insulation properties of the room.

Previously this has been accomplished by fixing battens to the backing structure and fixing the panels to the battens. This has the disadvantage of difficulty in fixing the panels to the battens if a flush joint is desired. It has been necessary to screw or bolt the panels to the battens, but in order to avoid bolt heads appearing on the panelling it has been proposed to cement the panels to the battens. These methods suffer from the disadvantage that prolongation of the construction operation occurs owing to the necessity of using two or more stages during construction. In some cases it is desirable not to have a flush joint but rather to have a lapped joint. Here again there is the disadvantage of having a multiplicity of constructional stages.

It is an object of this invention to provide a self-battening system for joining panels.

Therefore according to the present invention we provide a panel of a synthetic thermoplastic polymeric material for fastening to a supporting structure in combination with similar panels to provide a cladding such that the main area of the panel is spaced from said supporting structure, said panel having at least one recess along at least one edge but not more than two edges, where two edges are recessed these being adjacent edges, which recess has a base at such depth that it provides the means whereby said panel is maintained in spaced relationship from said supporting structure.

It is to be understood that by a recess we mean:

(1) a continuous narrow trough formed along an edge of said panel, the trough being bounded along one of its upper edges by the main area of the panel.

(2) a plurality of narrow troughs as in (1) but disposed in line along one edge.

(3) a continuous trough as in (1) having along the upper edge not bounded by the main area of the panel a relatively narrow flange.

(4) a plurality of troughs as in (2) each having along the upper edge not bounded by the main area of the panel a relatively narrow flange.

(5) a continuous stepped structure formed by bending an edge of the sheet in two directions one bent position forming said base and being accessible for fixing purposes.

(6) a discontinuous stepped structure having a plurality of bent edges as in (5).

We further provide a process for fixing together panels as hereinbefore defined comprising fastening one such panel to the supporting structure using said recess or recesses as battening means and subsequently applying a second panel so that said recess or recesses are covered by said second panel.

Further in accordance with our invention we provide a cladded structure secured to a supporting structure comprising a plurality of panels, as hereinbefore described, the panels being arranged such that at least similarly disposed panels on one pair of opposite edges of one panel are secured in overlapping relation with said one panel, the recess or recesses of said one panel being covered by the edge of the similar panel located near the recess or recesses of said one panel, and the edge of said one panel further from the recess or recesses of said one panel covering the recess or recesses of the similar panel located near that edge.

The recesses in our panels form projections through which screws or other attaching means may be passed to fix the panel to the supporting structure. At the same time, by acting as projections they hold the flat area of the panel away from the supporting structure and thus obviate the need for conventional battens on the supporting structure itself. The panel of the invention may have a plurality of recesses formed into the panel along and near one edge or alternatively, the recesses may take the form of continuous channels extending along substantially all of said edge or edges. It is to be preferred that the recesses take the form of channels.

If the recesses are of the form of one continuous recess, we prefer that a flange is formed perpendicular to the limb of the recess nearest the edge of the panel so that said flange can support that part of edge of a second panel that is butted against the first panel. Alternatively, a flange may be formed on the inner limb of the recess to support the second panel.

The invention is illustrated by way of example only and with reference to the accompanying drawings wherein.

Figure 1:
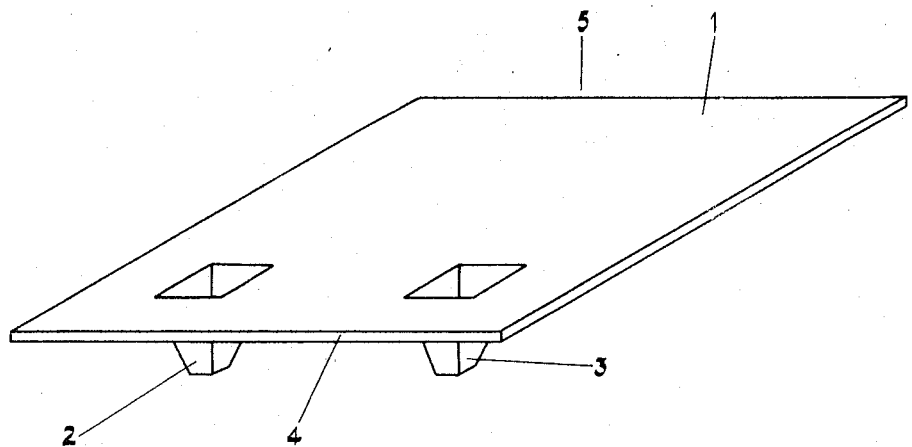
FIGURE 1 is a perspective view of a simple panel with two recesses.

In FIGURE 1 the panel comprises a rectangular sheet 1 of rigid polyvinyl chloride in which two recesses 2, 3 are vacuum formed near to one edge 4 of the panel. Thus the panel 1 may be fastened to a wall using recesses 2, 3 as battens or spacers. When a second panel of the same form as panel 1 is joined to panel 1, the edge of the second panel corresponding to edge 5 of panel 1 overlaps the edge 4 of panel 1 sufficiently far to cover the recesses 2, 3.

Figure 2:
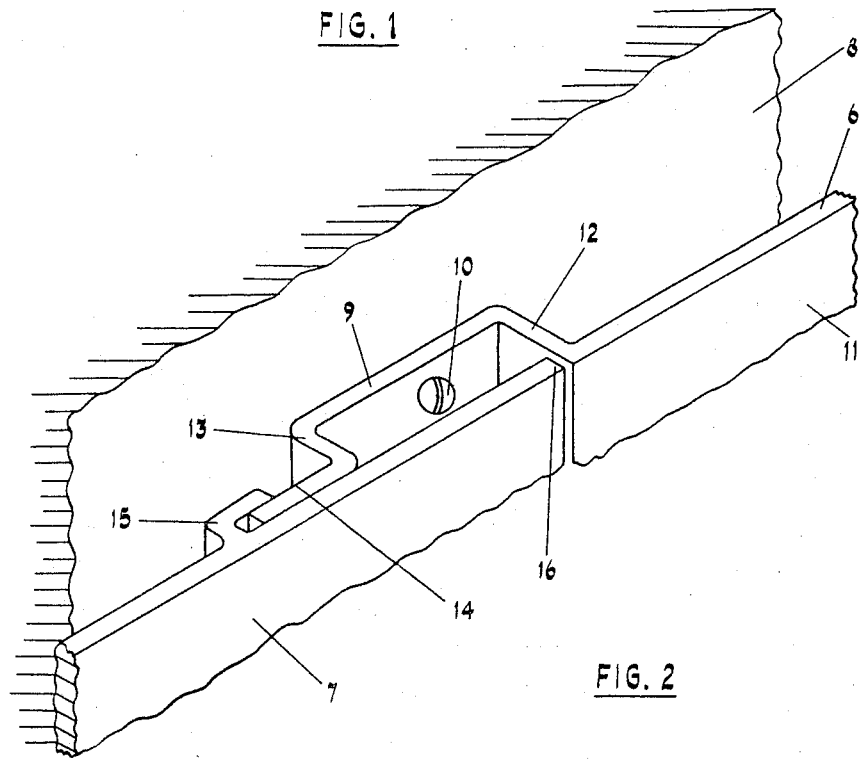
FIGURE 2 is a perspective view of the top of a joint between two panels fastened together to form a flat surface, the recess being in the form of a continuous channel along one edge of one of the panels.
Figure 3:
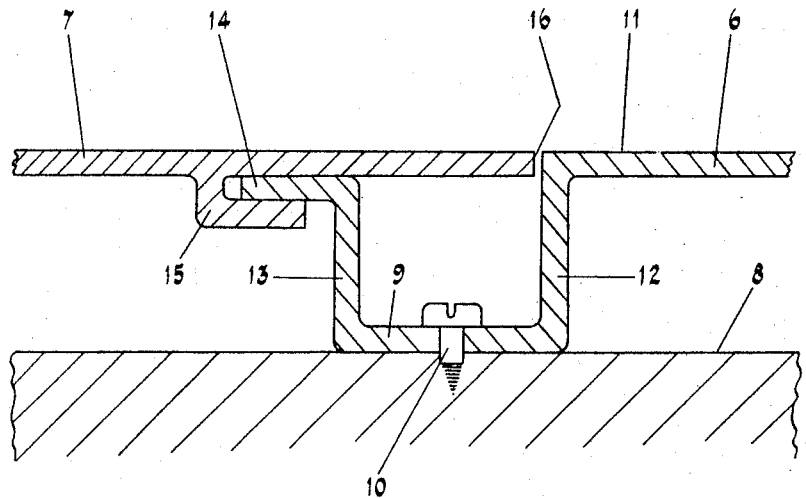
FIGURE 3 is a cross sectional view through the junction shown in FIGURE 1.

In FIGURES 2 and 3 two panels 6, 7 made from extruded rigid polyvinyl chloride are fastened to a wall 8. Panel 6 has a channel section 9, preformed in the extrusion process, such that when the channel 9 is fixed to the wall 8 by means of screws, one of which is shown at 10, the surface 11 of panel 6 is at a predetermined distance from the wall 8. This distance is set by the depth of the inner limb 12 of the channel section 9. The outer limb 13 of the channel 9 is made shorter than the inner limb 12 by an amount equal to the thickness of panel 7, so that when the two panels are butted together, a flush surface results. The outer limb 13 of the channel 9 has a flange 14 formed on it to provide a larger surface for panel 7 to rest against. Panel 7 is provided with a continuous section 15 formed in the extrusion process and which acts as a clip to engage with the flange 14 formed on the channel section. Thus the sequence of assembly of the panelling is firstly, to screw channel 9 of panel 6 to the wall 8; panel 7 is then butted on, clipping the section 15 over flange 14 such that the edge 16 of the panel 7 butts against the inner limb 12 of channel 9, thereby concealing the channel section.

Figure 4:
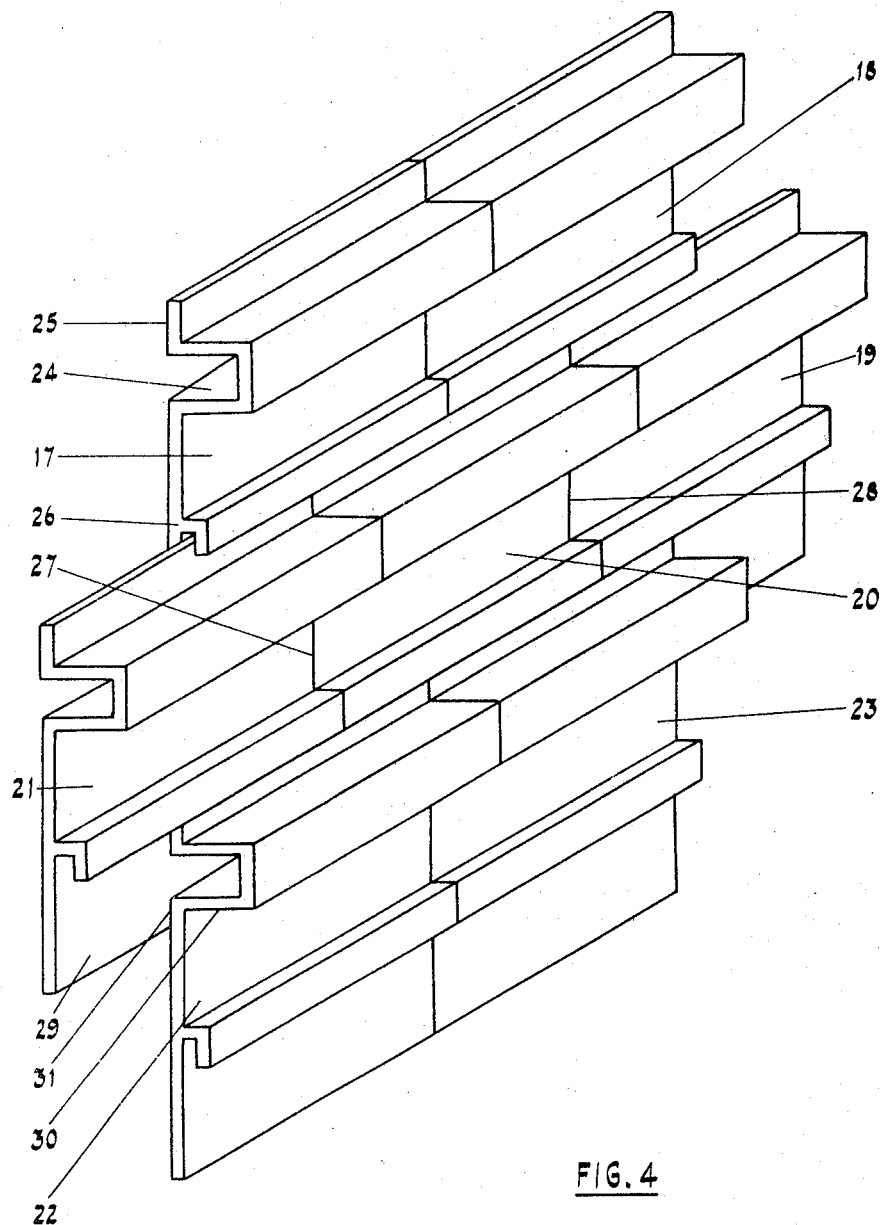
FIGURE 4 is a perspective view of seven panels fastened together to form a continuous wall cladding, the panels being similar to those shown in FIGURES 2 and 3 except that overlapping joints are formed instead of flush joints.

In FIGURE 4, seven extruded panels, 17, 18, 19, 20, 21, 22 and 23 are fastened together as a wall cladding. The wall is not shown since it would conceal the detail. The panels are similar to those shown in FIGURES 2 and 3 and have channels, flanges and clip sections formed in the extrusion process. On panel 17 the channel is shown at 24, the flange at 25 and the clip section at 26. Each panel is in a staggered relationship to those immediately above or below it. Considering panel 20 it is seen that the four panels 17, 18, 22, 23 are connected to the upper and lower edges of panel 20 by way of the invention, while panels 19 and 21 form simple butt joints along the edges 27 and 28 of panel 20. In this example the joints by way of the invention are overlapping as opposed to the flush joints of FIGURES 2 and 3. Thus the edge 29 of panel 21 overlaps both the channel 30 and part of the surface 31 of panel 22. The panels are fastened to the wall using the channel sections e.g. the two shown at 24 and 30.

Figure 5:
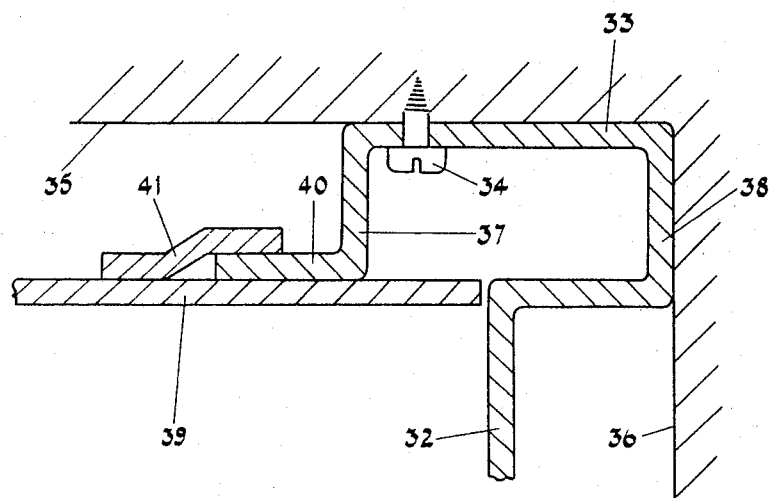
FIGURE 5 is a cross sectional view through the junction of two panels to form a corner.

In FIGURE 5 the invention is applied to the jointing of panels at a corner. One panel 32 has a preformed continuous recess 33 and this recess 33 is screwed by a screw 34 to a wall 35 near the corner formed by the walls 35, 36. The outer limb 37 of the recess 33 is made shorter than the inner limb 38 by a distance equal to the thickness of the second panel 39. The outer limb 37 of recess 33 has a preformed flange 40 which engages with a multiplicity of clips one of which is shown at 41 cemented to panel 39. Assembly of the panels is carried out in exactly the same way as in the case shown in FIGURES 2 and 3.

Figure 6:
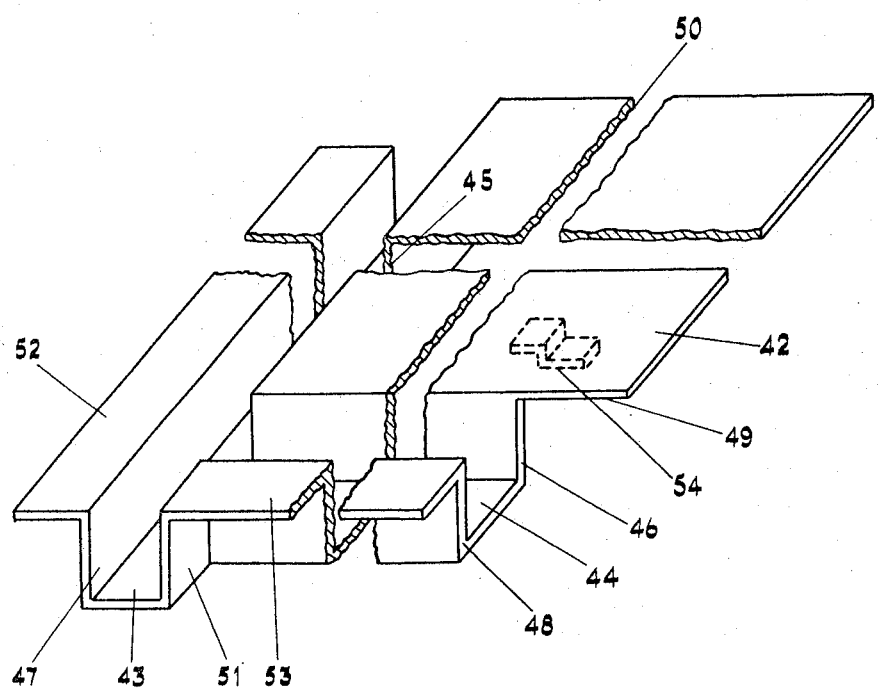
FIGURE 6 is a perspective view of a standardised panel that may be used to build up a larger surface.

In FIGURE 6 a standardised panel 42 of rigid polyvinyl chloride is shown split in order to show all the relevant details without making them unduly small. The standard panel comprises a flat surface having two continuous recesses in the form of channels 43 and 44 formed by a vacuum forming process along two adjacent sides of the panel. The outer limbs 47, 48 of the channels 43 and 44 respectively are made shorter than the inner limbs 45, 46 so that the flat surfaces of adjoining panels, corresponding to surfaces 49, 50 of panel 42, may conceal the channels and present a flush surface. However, in the region of the junction of the two channels, the inner limb 51 of the channel 43 is the same height as the outer limb 48 of channel 44 to enable a flush fit of the surface of an adjoining panel corresponding to surface 50 of panel 42. The channels have flanges 52, 53 preformed to support adjacent panels. Clips, only one of which is shown in the drawing at 54, are fitted to the under surface of the panel 42, to engage with the flanges of adjoining panels.

Figure 7:
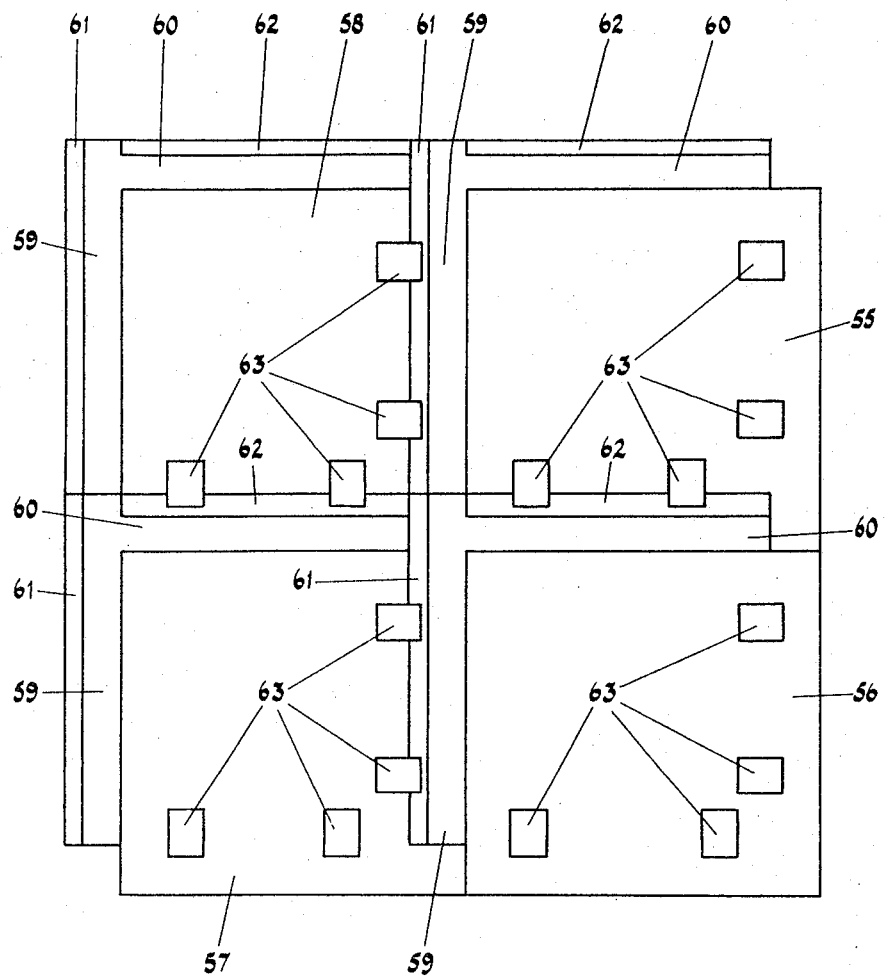
FIGURE 7 is a plan view of an assembly of four standard panels which are similiar to that shown in FIGURE 6.

In FIGURE 7 four standard panels 55, 56, 57, 58 are shown assembled and viewed from the underside. Each panel has the two channels 59, 60 and flanges 61, 62 corresponding to those of the standard panel shown in FIGURE 6 and each panel is fitted with four clips 63 to engage with the flanges 61, 62.

Figure 8:
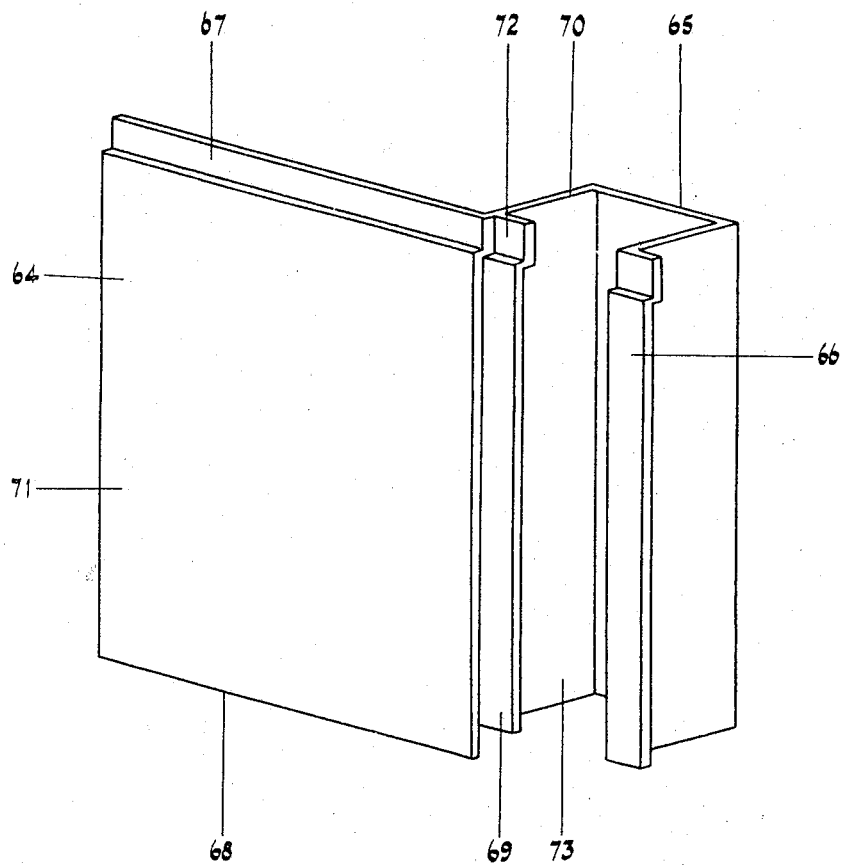
FIGURE 8 is a perspective view of another panel with a continuous recess.

In FIGURE 8 a panel 64 is shown having a continuous channel sectioned recess 65 along one edge. A flange 66 is also formed along that edge.

The top edge 67 of the panel is stepped so that the bottom edge of another panel (corresponding to edge 68 of panel 64) can be supported by the stepped edge 67 with the surfaces of the two panels flush. Similarly a supporting flange 69 is formed perpendicular to the inner limb 70 of the channel sectioned recess 65. This enables the edge of another panel (corresponding to edge 71 of panel 64) to be supported flush with the surface of panel 64 over the channel sectioned recess 65. This flange 69 is also stepped at the top 72 in order to receive the stepped edge of the panel it supports (corresponding to the edge 67 of panel 64). The channel sectioned recess 65 does not extend the whole of the length of the panel 64 but is shorter by the width of flange 67 at the bottom end 73 of the channel sectioned recess 65. This is to enable the panels to be overlapped without overlapping the channel sectioned recesses.

By this form of construction full weather-proofing and a flush surface may be obtained.

It is to be preferred that the recess or recesses are made along and near to two adjacent edges of the panel, so that a large surface may be built up from a multiplicity of smaller panels. To this end it is preferable that the panels are made a standard size to facilitate construction.

The recess or recesses may be made in the thermoplastic sheet by any of the usual methods but a pressure assisted forming method, such as vacuum forming or blow moulding is particularly convenient. In some cases e.g. when the panel has only one recess, this being in the form of a continuous channel, it may be possible to produce the sheets by an extrusion process. In this case the clips may take the form of a continuous strip formed integral with the panel by an extrusion process. The panels may have other features shaped into them during the same process. The recess or recesses may be fastened to the supporting structure by any conventional means, for example, by bolts, screws, rivets or cement.

The second panel may be cemented to the flange or outer limb of the channel section but this is not essential. For example it may be undesirable to cement them together in some cases e.g. in temporary structures such as exhibition stands or where the panels may be subjected to widely differing temperatures, thereby causing expansion.

The joint appearing at the surface of the two panels may be filled in, if desired, by welding a strip of material similar to that of the panels. The welded joint may then be sanded and/or buffed down to provide a flush joint concealing the original crack between the panels. Again welding is not desirable when a temporary structure is being constructed or where excessive expansion may occur.

Synthetic thermoplastic polymeric materials that are suitable for use in the present invention include such polymeric materials as, for example, the polymers and copolymers of vinyl chloride containing up to 20% by weight of vinyl acetate or vinylidene chloride; the polymers and copolymers of acrylic and/or methacrylic esters e.g. polymethyl methacrylate, the copolymers of methyl methacrylate and lower alkyl acrylates having from 1 to 10 carbon atoms in the alkyl radical such as ethyl acrylate and 2-ethyl hexyl acrylate; polystyrene; the rigid copolymers of butadiene and styrene and/or methyl methacrylate, with or without acrylonitrile as an additional comonomer, in particular copolymers of acrylonitrile with butadiene and styrene; and the polymers and copolymers of olefines, in particular high density polythene and polypropylene.

We prefer to use the polymers and copolymers of vinyl chloride containing up to 20% by weight of vinyl acetate and containing less than 10% by weight of plasticizer, as these are for the most part non-inflammable and hence safe for use for building constructional purposes.

We claim:
1. A generally rectangular panel of a synthetic thermoplastic polymeric material for fastening to a supporting structure in combination with similar panels to provide a cladding such that the main area of the panel is spaced from said supporting structure, said panel having a continuous recess along at least one edge but not more than two edges, where two edges are recessed these being adjacent edges, which recess is in the form of a trough having a base at such a depth that it provides the means whereby said panel is maintained in spaced relationship from said supporting structure, and has a flange formed on the limb forming the side of the trough remote from the main area of the panel, said flange lying in a plane substantially perpendicular to the plane of said limb and extending from said limb in a direction away from the main area of the panel, said panel being provided with at least one clip on the face of the panel from which said recess projects but near to the edge of the panel that is opposite to the recessed edge of the panel, said clip having a flange extending, in a plane spaced from but substantially parallel to the plane of the panel in the vicinity of said clip, from its point of attachment to the panel towards the edge of the panel opposite to the recessed edge, said clip being arranged to hold one panel to a second panel by the clip of one panel engaging with the flange formed on the limb of the recess of the second panel.

2. A panel as claimed in claim 1 wherein the clip is formed integrally with the panel.

3. A panel as claimed in claim 1 in which a flange is formed over part of said recess, said flange lying in a plane substantially parallel to the plane of the flat area of the panel.

4. A panel as claimed in claim 1 in which at least the edge of the panel containing said recess is stepped to receive an edge of a second similar panel and to support said second panel flush with said first panel.

5. A panel as claimed in claim 1 in which only one edge of the panel is recessed in the form of a continuous trough.

6. A cladded structure comprising a plurality of similar panels according to claim 1 secured to a supporting structure, said panels being arranged such that at least first and second panels disposed on one pair of opposite edges of a third panel are secured in overlapping relationship with said third panel, the recess of said third panel being covered by the edge of the first panel which panel is located nearer the recess of said third panel, and the edge of said third panel further from the recess of said third panel covering the recess of the second panel, which panel is located nearer that edge, the clips of said third panel engaging with the flange extending from the limb of the trough recess of said second panel and the clips of said first panel engaging with the flange extending from the limb of the trough recess of said third panel.

References Cited by the Examiner
UNITED STATES PATENTS

| | | | |
|---|---|---|---|
| 1,502,681 | 7/1924 | Pommersheim | 52—552 X |
| 2,354,485 | 7/1944 | Slaughter | 52—309 X |
| 2,432,445 | 12/1947 | Roe | 52—309 |
| 2,482,835 | 9/1949 | Bremer | 52—553 X |
| 2,852,807 | 9/1958 | Altschuler | 52—309 X |
| 2,931,214 | 4/1960 | Maccaferri | 52—390 X |
| 2,982,054 | 5/1961 | Anderson | 52—309 X |
| 3,004,295 | 10/1961 | Bottoms et al. | 264—92 |
| 3,085,367 | 4/1963 | De Ridder et al. | 52—588 X |
| 3,114,218 | 12/1963 | Macquere | 52—309 X |

FOREIGN PATENTS

| | | |
|---|---|---|
| 856,069 | 3/1940 | France. |
| 670,471 | 4/1952 | Great Britain. |

FRANK L. ABBOTT, *Primary Examiner.*

A. C. PERHAM, *Assistant Examiner.*